United States Patent [19]
McNeill et al.

[11] Patent Number: 5,950,941
[45] Date of Patent: Sep. 14, 1999

[54] DISSIPATOR FOR REDUCING ELECTROSTATIC CHARGE IN FINES GENERATED BY A COFFEE GRINDER

[75] Inventors: Robert C. McNeill, Georgetown, Ind.; Richard J. Signorello, La Grange, Ky.

[73] Assignee: Grindmaster Corporation, Louisville, Ky.

[21] Appl. No.: 09/072,487

[22] Filed: May 4, 1998

[51] Int. Cl.⁶ .................................................. B02C 19/00
[52] U.S. Cl. .................... 241/79.1; 241/100; 241/186.3; 241/245; 241/246
[58] Field of Search .......................... 241/79, 79.1, 100, 241/186.3, 245, 246, 247, 248

[56] References Cited

U.S. PATENT DOCUMENTS

| | | | |
|---|---|---|---|
| 3,021,984 | 2/1962 | Engi | 241/100 |
| 3,094,290 | 6/1963 | Engi | 241/100 |
| 4,813,622 | 3/1989 | Nidiffer et al. | 241/100 |
| 4,893,759 | 1/1990 | Mizobata | 241/100 |
| 5,201,474 | 4/1993 | Midden | 241/100 |

*Primary Examiner*—John M. Husar
*Attorney, Agent, or Firm*—Wheat, Smith & Beres, PLC; Vance A. Smith; David W. Nagle, Jr.

[57] ABSTRACT

An apparatus for the preparation of ground material used to make a beverage includes an electrostatic precipitator to prevent the separation of chaff fines from a main stream of the ground material. The apparatus includes a grinder and a chute leading from an exit opening in the grinder to a receptacle for receiving the ground material. The electrostatic dissipator is positioned near the exit opening for minimizing the electrostatic charge on chaff fines created by the grinder, thereby preventing the separation of chaff fines from the main stream of ground material.

18 Claims, 8 Drawing Sheets

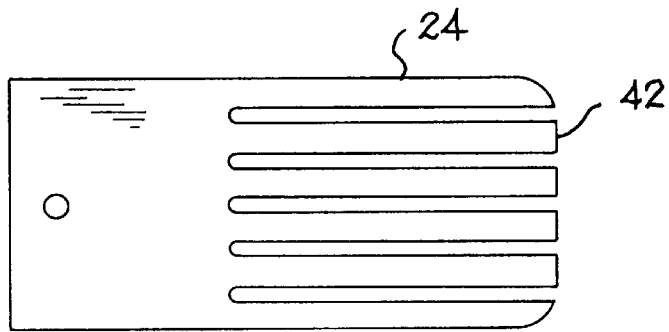
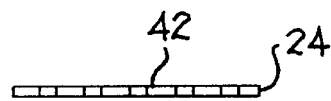
FIG. 7a
FIG. 7b
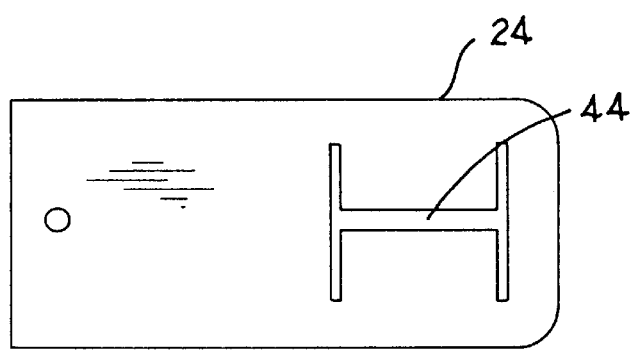
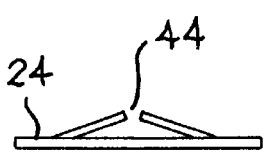
FIG. 8a
FIG. 8b
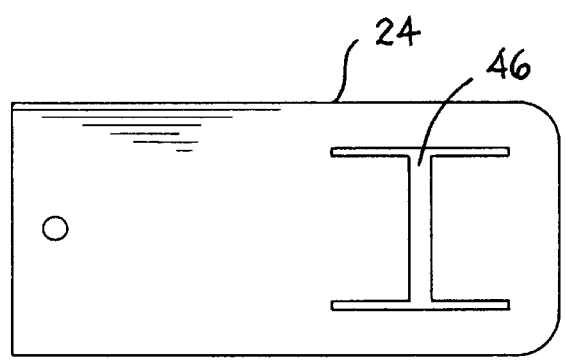
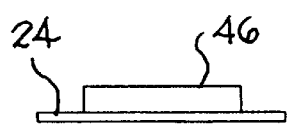
FIG. 9a
FIG. 9b

DISSIPATOR FOR REDUCING ELECTROSTATIC CHARGE IN FINES GENERATED BY A COFFEE GRINDER

BACKGROUND OF THE INVENTION

The present invention relates to coffee grinders and, more particularly, to coffee grinders having a component for the suppression of fines generated by the grinder action of the mechanism for grinding the coffee beans into ground coffee.

Apparatus for grinding coffee beans into ground coffee have found significant consumer acceptance, probably due to the perceived freshness of the coffee produced with recently ground coffee. Many commercial establishments use combinations of coffee grinders and brewers or a single unit having the combined features to produce coffee of the freshness now being demanded by the consumer. Grocery chains have long recognized that many discerning coffee drinkers prefer to grind their own coffee at the store and thus have provided coffee beans and the necessary apparatus for the self grinding of the beans into ground coffee. The roasted coffee bean, however, produces along with the particles of ground coffee a very fine powder, primarily bean husk, called chaff fines that tends to float and separate from the main stream of ground coffee that emerges from the coffee grinder. During grinding, some of the chaff becomes lodged against underlying exterior surfaces of the grinder and adheres to the exposed surfaces of the grinder and associated equipment. Applicants have determined that the problem is largely due to electrostatic attraction of the exposed surfaces of the grinder to the chaff fines and has noted the problem to be particularly exacerbated when the grinder is used under extremely dry conditions such as heated facilities during the winter months. Moreover, where a coffee brewer is in close vicinity to the grinder as in the combination of a grinder and brewer in the same apparatus, a gummy substance produced by the moisture from brewing coming into contact with the chaff fines adhering to the apparatus wall is produced. Frequent cleaning is required in order to provided for a clean appearance and proper functioning of the apparatus.

A number of devices are described in the prior art that claim to reduce the frequency of cleaning of grinders due to chaff generation. As examples of such devices, reference is first made to U.S. Pat. Nos. 4,813,622 and 5,042,731, both assigned to the Bunn-O-Matic Corporation and describing a coffee grinder unit with a discharge chute unit of the type typically found in grocery stores. The units are provided with a chaff fine suppressor in the form of lever-like member. The member is attached to the discharge unit immediately adjacent the opening into the grinder. The chaff fine suppressor in each of the aforementioned patents serves mainly to physically prevent the coffee chaff fines from separating from the main stream of coffee grounds. To some extent as determined by applicants, the chaff springs, when made of a conducting material and electrically grounded, may also serve to dissipate a portion of the electrostatic charge imparted to the stream of ground coffee particles, including the chaff fines. Still another example of a chaff spring is found in U.S. Pat. No. 5,201,474 also assigned to the Bunn-o-Matic Corporation. The grinder described in this patent has a component associated with the grinding burrs that, according to the patentee, functions to keep the chaff fines within the ground coffee stream. A further example is noted in U.S. Pat. No. 5,244,414 assigned to the Grindmaster Corporation wherein a problem associated with the moisture created in proximity of the chaff fines is described. A moisture prevention valve is described that closes the opening to the grinder immediately above the brew basket during the brewing operation. This closing of the opening prevents the moisture from the brewing operation from seeping back into the chute from the grinder area and being absorbed by the coffee in the chute and grinding mechanism. It also tends to prevent the moisture from coming into contact with the chaff fines that may have accumulated on the walls of the apparatus. The moisture tends to clump the ground coffee and particles together in a larger mass that does not readily flow. While the inventions described in each of the aforementioned patents function to lessen the problems associated with chaff fines, the problem of chaff collection on the surrounding walls of the apparatus is nevertheless still prevalent to a significant degree, resulting in significant downtime during cleaning periods, unsightly appearance, and interference with the grinding operation. There are many who believe that the chaff left from previous grinding operations unfavorably distorts the flavor of coffee made from ground coffee of subsequent grinding operations.

As stated above, applicants have determined through a thorough investigation that a significant amount of chaff fines accumulate on the exterior surfaces of the grinder due to the presence of an electrostatic charge on the stream of particles produced during the grinding operation. Despite the use of chaff springs of the prior art, even when incidentally made conducting and electrically grounded, the charge on the stream remains to a large extent as evidenced by the large amount of chaff fines that clings to the surrounding surfaces of the apparatus. The chaff fines, being of less mass and dimensionally much smaller than the grounds, are significantly affected by the charge formed on the chaff fines during the grinding. The chaff fines are repelled by the similar charge carried by the stream of ground coffee and separate from the stream. The ground coffee, being coarser and thus much larger is unaffected by the charge and proceeds downwardly. The chaff fines under the influence of the charge becomes repelled by the stream and is attracted by the opposite charge lying on the surrounding surfaces of the apparatus induced by the charge on the stream of ground coffee. This lead applicants to determine that a continuous and substantial neutralization of the electrostatic charge imparted to the ground coffee and chaff fines following the grinding operation would significantly minimize the accumulation of chaff fines on the exterior surfaces, thereby resulting in the reduction in the frequency of cleaning needed by operating personnel and minimize the other objections created by the presence of chaff. Applicants then set about to implement their findings, namely, devising components that more effectively dissipate the electrostatic charge given to the stream of material, including the chaff fines.

It is therefore a paramount object of the present invention to further reduce the frequency and duration of cleaning apparatus for the grinding of materials where chaff fines from the grinding process accumulate on the exterior surfaces of the grinding apparatus due to the induced electrostatic charge on the ground particles exiting the grinder.

It is still a further object of the present invention to provide for a simple but efficient mechanical component associated with a grinder that effectively reduces or neutralizes the induced electrostatic charge imparted to particles comprising the stream of material exiting the grinder.

It is yet a further object of the present invention to provide for a mechanism combined with the functions of a chaff spring that more effectively reduces the electrostatic charge imparted to the stream of material including chaff fines.

These and other objects will become readily apparent and met through a reading of the description of the present invention along with the drawings described below.

SUMMARY OF THE INVENTION

The invention herein pertains to grinding apparatus, such as coffee grinder, for example, that grinds material into dry particles for dissemination either into a container for further beverage processing or directly into a beverage preparation area such as brew basket. The apparatus is further provided with a conducting and grounded element that extends into the stream of particles exiting from the grinder that effectively dissipates the electrostatic charge imparted to the particles, including the chaff fines. The element has a configuration that defines a "dislocation" or "dislocations" that serve to concentrate the flux lines associated with the charge on the particles and conduct away the charge on the particles thereby substantially reducing the attraction between the chaff fines and the surrounding surfaces of the grinding apparatus. "Dislocation(s)" for purposes of this description may be defined as a sharp discontinuity or discontinuities in the surface or edge configuration of the element.

In accordance with a preferred embodiment of the present invention, the element may be combined with a chaff spring mounted near the throat opening of the grinder to the apparatus and extending across the opening so as to be within the stream of coffee particles exiting the grinder of the apparatus. The dislocation may take the form of sharp points in the surface of the chaff spring, slots through the spring, or sharp points defined by the edge configuration of the spring.

DESCRIPTION OF THE DRAWING

FIGS. 7a and 7b are, respectively, top and end views of chaff spring having dislocations in the configuration thereof in which the dislocations are a plurality of fingers extending from the main body of the spring;

FIGS. 8a and 8b are, respectively, top and end views of chaff spring in which the dislocation takes the form of an elongated opening parallel to the long axis of the spring;

FIGS. 9a and 9b are, respectively, top and end views of a chaff spring in which the chaff spring dislocation takes the form of an elongated opening positioned across the long axis of the spring;

DETAILED DESCRIPTION OF THE PREFERRED EMBODIMENT

The ensuing discussion, while primarily pertaining to a combination coffee grinder and brewer, is being provided by way of example only. As will be appreciated, the electrostatic dissipator as described is suitable for use in any apparatus for the grinding of particles from source materials, irrespective of the presence of a beverage maker such as brewer, where the accumulation of chaff fines pose a significant problem.

Figure 1:
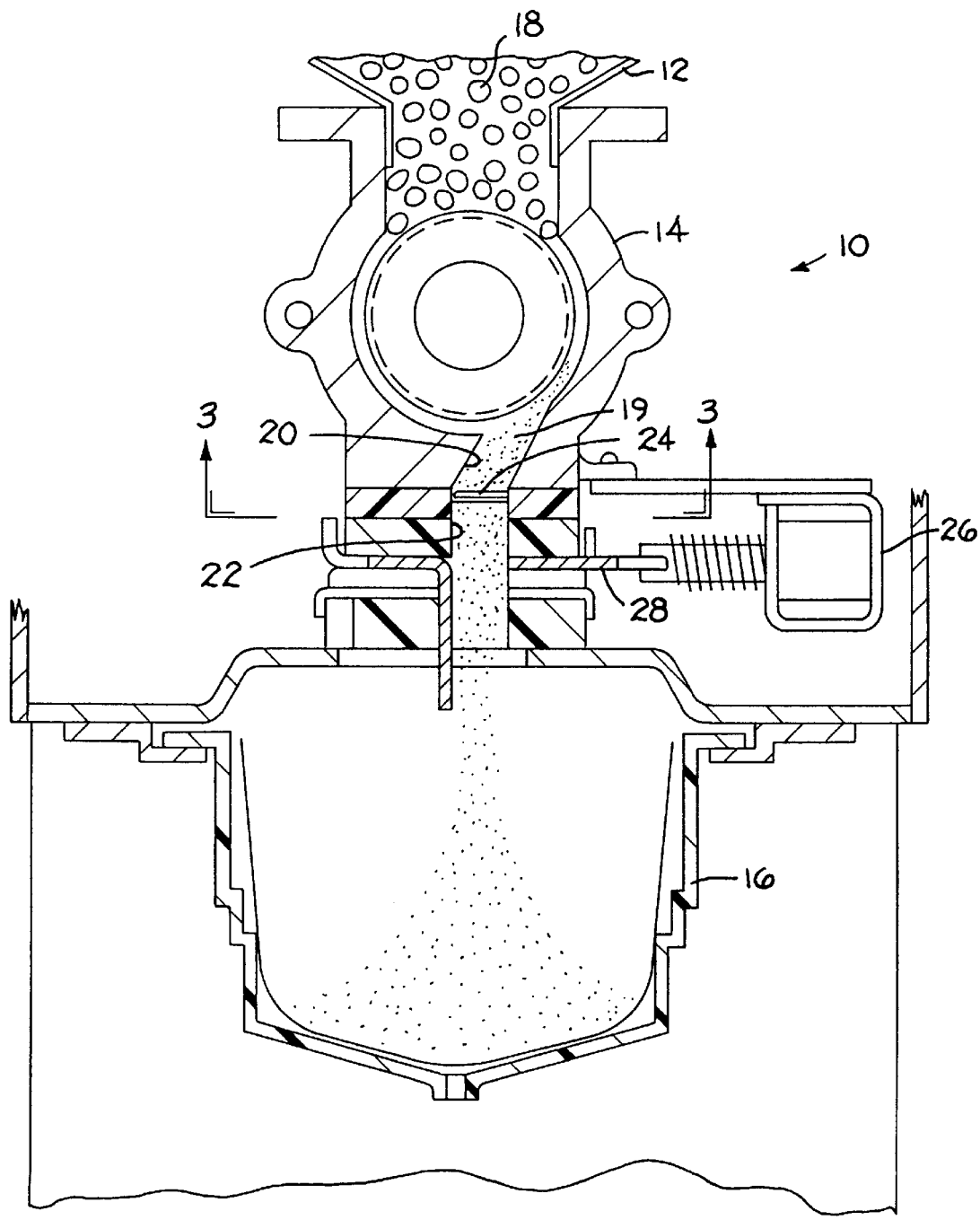
FIG. 1 is a front section of a coffee grinder and brewer having a chaff spring extending across the mouth of the opening from the grinder to the brew basket area in accordance with the present invention.

Reference is initially made to FIG. 1 illustrating in side section a portion of a grinder-brewer apparatus 10 comprising a hopper 12, a grinder 14, and a brew basket 16 secured to the apparatus 10. Hopper 12 contains coffee beans 18 that fall into the grinder 14, are comminuted by grinding burrs into ground coffee 19, and thereafter are fed through the grinder throat 20 and then into a chute 22 that communicates with a region above the brew basket 16. A chaff spring 24 is positioned across grinder throat 20 near the boundary of the chute 22. A solenoid operated slide valve 26 secured to the head of grinder 14 is positioned so that the blade 28 of the slide valve closes the throat 20 following the grinding operation and just before the brewing water is distributed over the coffee grounds in the brew basket.

Figure 5:
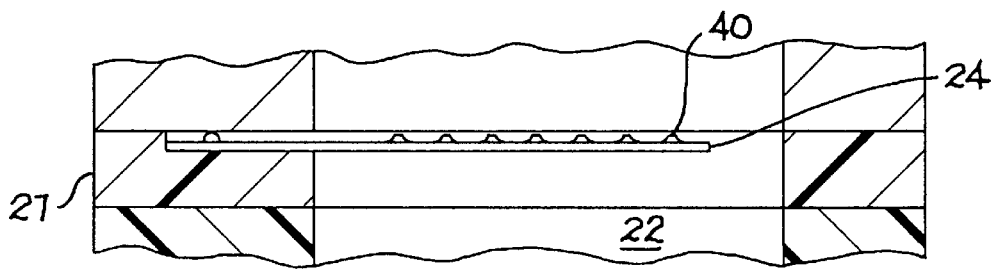
FIGS. 5 and 6 are side views, respectively, of a chaff spring shown in FIG. 3 in position prior to a grinding operation and in position during a grinding operation.
Figure 6:
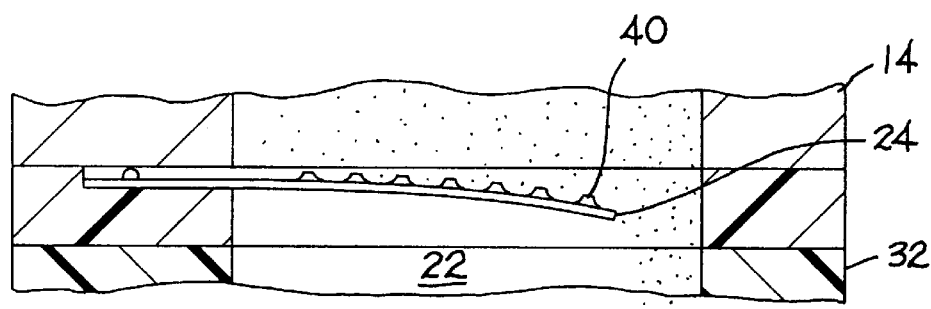
Figure 10A:
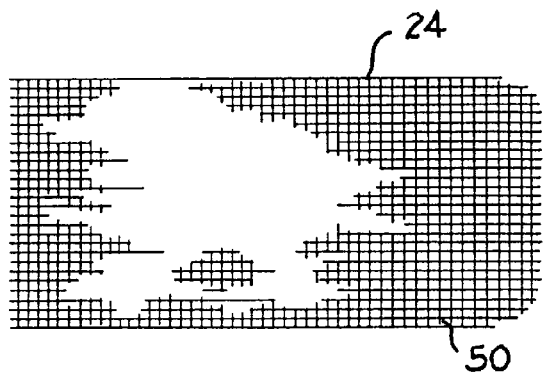
FIGS. 10a and 10b are, respectively, top and end views of a chaff spring in which the dislocations take the form of an interleaved grid of wire material.
Figure 10B:
Figure 11A:
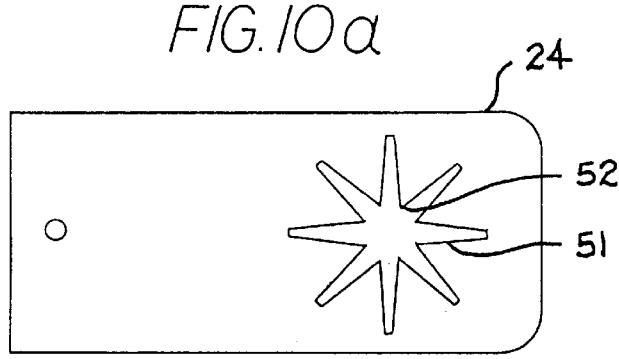
FIGS. 11a and 11b are, respectively, top and end views of a chaff spring in which the dislocation takes the form of a centrally located opening in an asterisk shape.
Figure 11B:
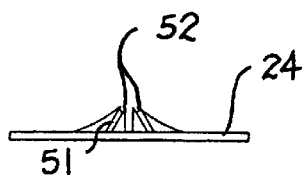

The views of FIGS. 3, 4, 5 and 6 illustrate the appropriate positioning of the chaff spring 24. The chaff spring 24 is typically made of a resilient, thin and flat sheet of a conducting material such as a metal, preferably having a rectangular shape, which is secured at one end to a mounted block 27. Block 27 is itself secured to underneath surface of the grinder so that the top opening 29 in block 27 registers with the mouth of the grinder throat. The spring 24 extends over a substantial portion of the opening 29 leaving a narrow gap 30 at one end. Gap 30 is used to allow for clearance of the end of chaff spring 24 when bending. The chute plate 32 defines the chute 22 and is fixed so as the chute registers with the bottom of opening 29. A comparison of FIG. 5 to 6 illustrates the pliancy of the spring 24 when coffee grounds are being thrust out of the grinder 14.

Figure 2:
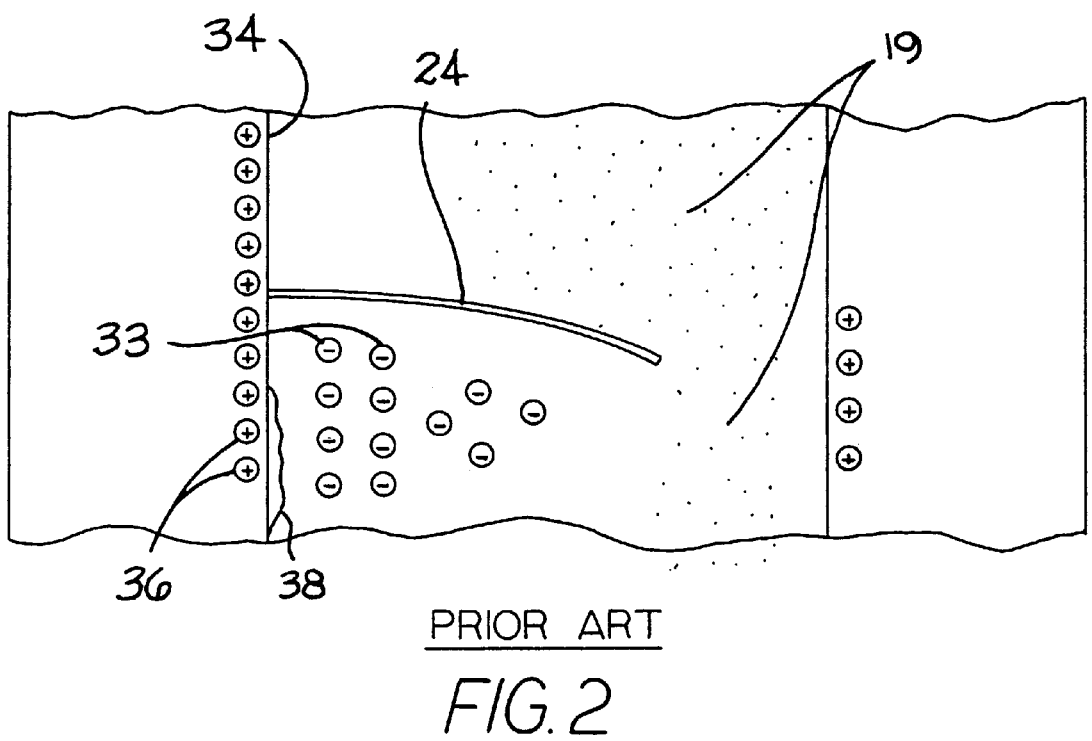
FIG. 2 is an enlarged view of the throat and chute area of a grinder brewer of the type shown in FIG. 1 showing schematically the attraction of the chaff to exposed metal surfaces as experienced by coffee grinders of the prior art.
Figure 3:
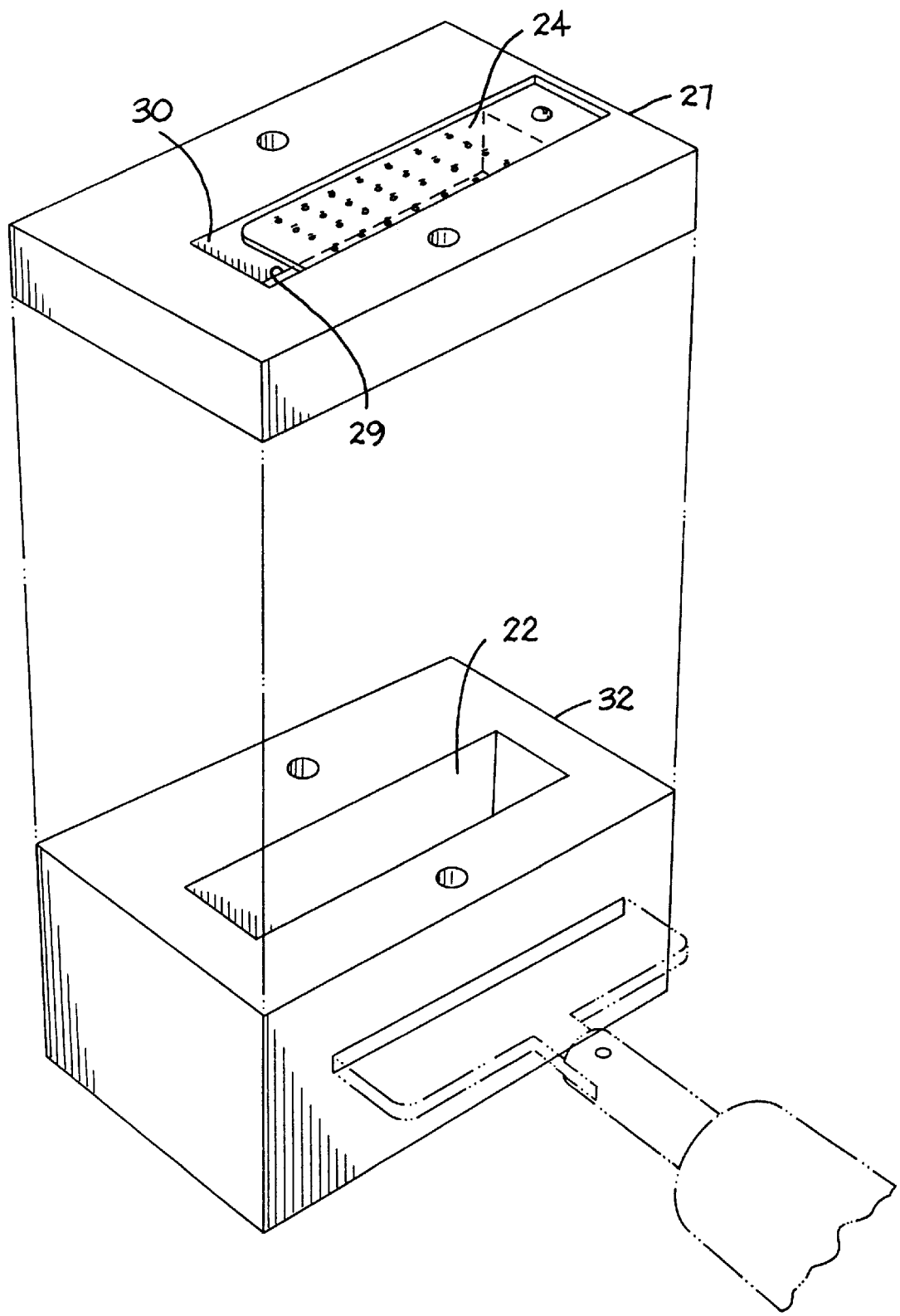
FIG. 3 is an exploded perspective view of a chaff spring provided with dislocations in the surface thereof in the form of sharp points in accordance with a preferred embodiment of the present invention.
Figure 4:
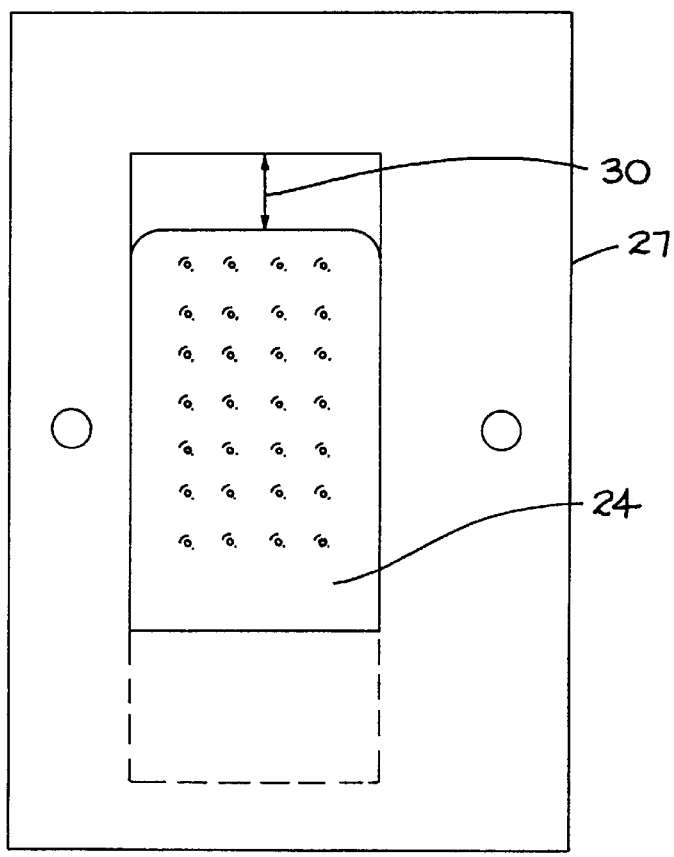
FIG. 4 is a view taken along lines 3—3 of FIG. 1 showing a top view of a chaff spring having dislocations therein like that seen in FIG. 3.

Referring back to the schematic of FIG. 2, depicting the environment of a chaff spring of the prior art, it may be seen that as the particles of ground coffee 19 exit from the grinder, each of the particles have been provided with an electrostatic charge arbitrarily shown as a negative charge by the circled minus signs shown by the character numeral 33. The particles 19, being more massive than the chaff fines, are largely unaffected by the repelling force of the charges and fall through the gap. The chaff fines, however, are repelled by the like charges and separate from the main stream. The exposed surfaces 34 having an induced positive charge because of the opposite charge of the stream of ground coffee is shown by the circled positive charges 36. The chaff fines, having the opposite charge, are attracted and cling to the surrounding surfaces as shown schematically by mass 38.

Based upon an understanding that a charged body having dislocations such as sharp edges or sharp points in the surface thereof provide positions for the increased discharge or electron flow between separated bodies of different charges, applicants determined that a grounded conducting member having dislocations in the configuration thereof and that is extended into the surface of the stream of ground material coming from the grinder would create an effective electrostatic discharge of the ground stream (including the chaff) as it passed by the chaff spring. The dislocations provide areas of increased flux vector fields and permit the flow of static electricity in the ground coffee to discharge or dissipate into the grounded conducting member. Applicant then combined this understanding into a chaff spring 24 by providing a preferred dislocation configuration to the chaff spring best illustrated by FIGS. 3–6. Such preferred dislocation takes the form of a multiplicity of sharp peaks 40. The sharp points 40 may be created, for example, by a sharp instrument pressed against the opposite side of the spring 24. The chaff spring 24, when mounted in apparatus 10, is oriented so as to present the sharp peaks 40 upwardly or directly facing into the stream of grounds coming from the grinder. A comparative test was then conducted comparing the performance of the chaff spring 24 provided with sharp peaks 40 to a flat, planar chaff spring having no dislocations, resembling those prior art chaff springs typically used in grinders servicing the food service industry. Both chaff spring 24 and the chaff spring of the prior art were made of conducting material and electrically grounded. Using each chaff spring under identical conditions, ten grinding cycles of about 12 seconds duration each were initiated that provided 10 equal throws of coffee to the brew basket (3 ounces per throw) without brewing. The brew basket was removed after the tenth cycle in each case. Chaff fines that had adhered to the certain internal surfaces of the grinder apparatus were collected and weighed following a 10 cycle test for both the chaff spring of the prior art and the chaff spring according to the present invention. About 4 grams of chaff was collected following the 10 cycle test using the chaff spring of the prior art as compared to about 0.7 grams with the chaff spring according to the present invention. The comparative test demonstrated a significant weight decrease in the chaff fines collected following the use of the electrostatic dissipating chaff spring constructed in accordance to the present invention.

Other and different chaff spring configurations with dislocations may be devised having a similar reducing affect on the separation of the chaff from the main stream of ground coffee. Reference is made now to FIGS. 7a, 7b to FIGS. 13a, 13b depicting further example of dislocations in a chaff spring 24.

Figure 12A:
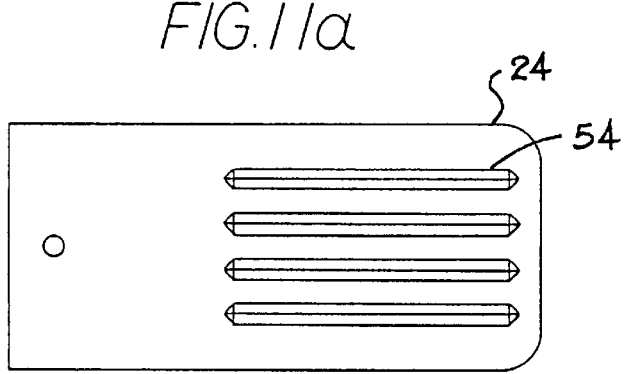
FIGS. 12a and 12b are, respectively, top and end views of a chaff spring in which the dislocations take the form of a plurality of ridges extend along the surface of the spring.
Figure 12B:
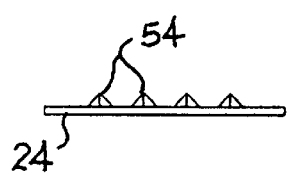
Figure 13A:
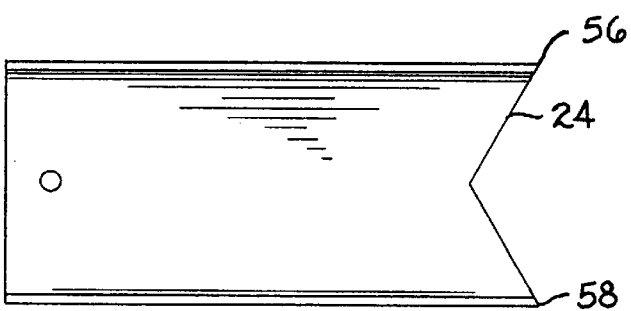
FIGS. 13a and 13b are, respectively, top and end views of a chaff spring constructed in which the dislocations take the form of a pair of flanges extending along the sides thereof.
Figure 13B:
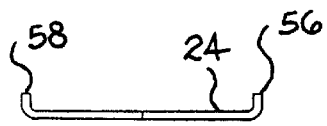

FIG. 7a shows a configuration in which the spring 24 has a plurality of separated fingers 42 extending a substantial length of the spring 24. The configuration of FIG. 7a causes some diminishing of the attraction of chaff fines to exposed surfaces compared to prior art flat chaff springs although less than the preferred configuration illustrated in FIGS. 3–6. The sharp edges of the fingers act as a flux concentrator of the electrostatic flux lines and a dissipator of the charge. The same reasoning is believed to apply to the H-shaped slot 44 of FIGS. 8a and 8b and the I-shaped slot 46 of FIGS. 9a and 9b. It should be noted that in each instance a portion of the ground coffee goes through the slots 44 or 46. Similarly, the grid configuration 50 of the spring 24 in FIG. 10a apparently concentrates the flux in certain regions leading to a discharge of the static charge on the grounds emerging from the grinder. The asterisked slot 51 of FIGS. 11a and 11b has upturned ends 52 toward the grinder 14 that act as electrostatic discharge points. FIGS. 12a and 12b have a plurality of sharp ridges 54 that run the length of spring 24 while the spring 24 of FIGS. 13a and 13b have a pair of side flanges 56 and 58 that are turned upwardly toward the emerging ground coffee stream. The ridges 54 and flanges 56 and 58 act as discharge points for electrostatic charge. Moreover, the side flanges 56 and 58 serve the additional purpose of physically guiding some of the chaff fines back into the main ground coffee stream and add some stiffness to the spring 24 forcing the ground coffee to make contact with the electrostatic dissipating components over a more extended time period.

Figure 14:
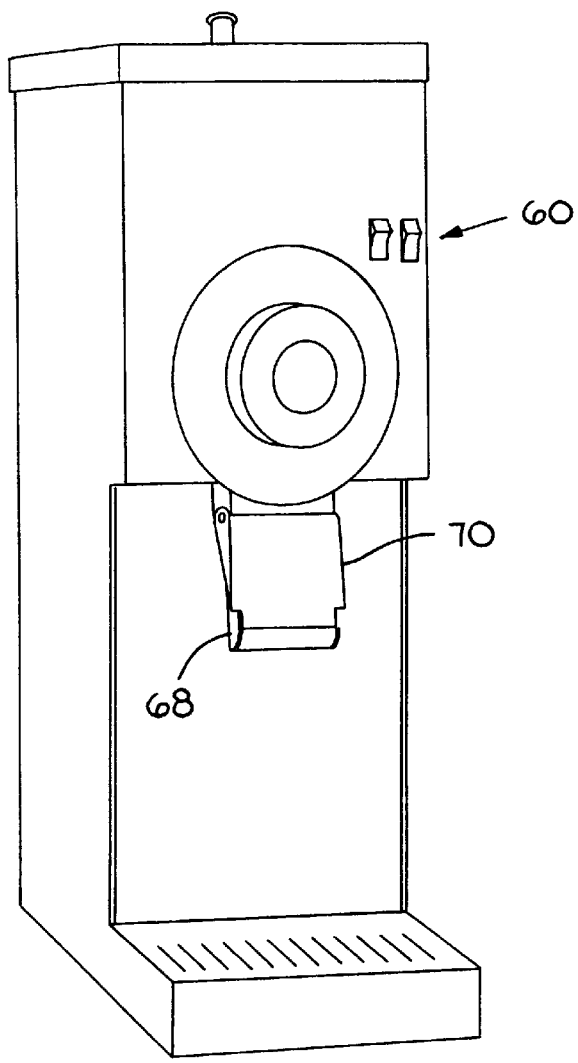
FIG. 14 is a perspective view of a grinder typically used in commercial establishments such as a grocery store using an electrostatic dissipating chaff spring constructed in accordance with the present invention.
Figure 16:
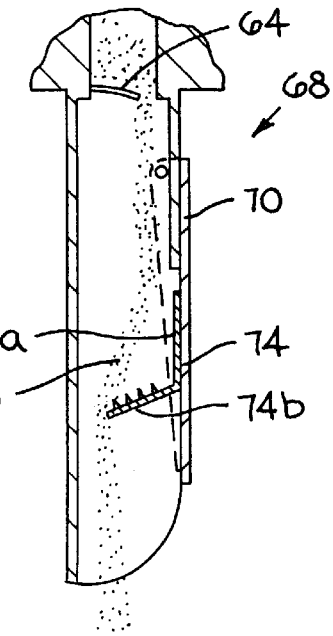
FIG. 16 is a side view of the chute in FIG. 15 showing still another electrostatic dissipator attached to the inside surface of the pivoting flap of the discharge chute.
Figure 15:
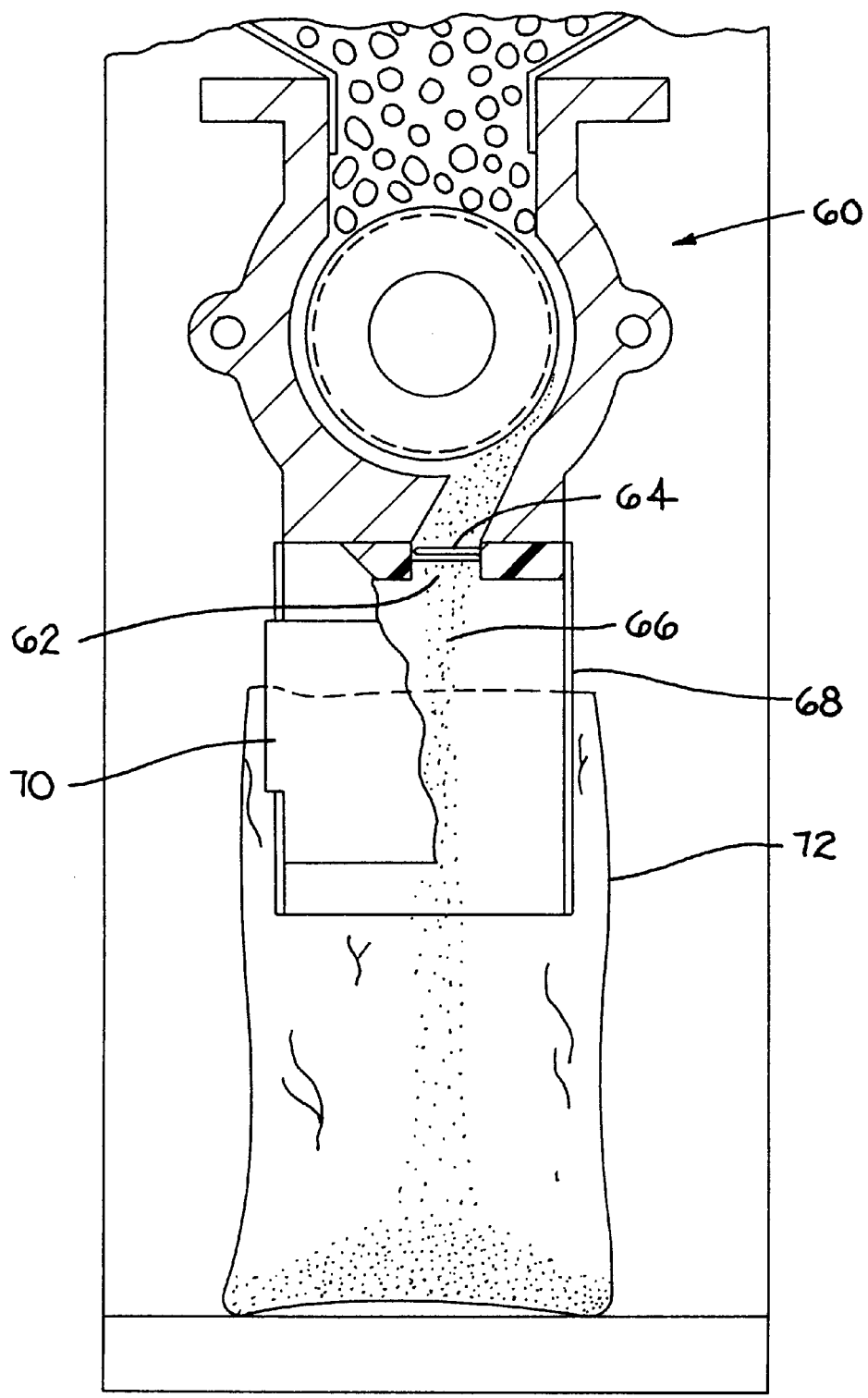
FIG. 15 is a front view, partially in section, of the grinder of FIG. 14 showing the electrostatic dissipator across the grinder throat.

As stated above, FIG. 1 and the ensuing FIGS. illustrate the use of the electrostatic dissipator with a combination of a grinder and brewer. It is further understood that the use of the dissipator is not limited to combination grinder and brewers, but finds advantageous use in grinders without brewers. For example, FIGS. 14, 15, and 16 illustrate that the electrostatic dissipating chaff spring constructed in accordance with the present invention has applicability with other and different type of grinding apparatus such as the grinding apparatus with a chute typically used in grocery retail chains. Such a grinder is shown generally by the character numeral 60 with a chute 68 covered by a pivoting flap 70. As best seen in FIG. 15, a chaff spring 64 extends across the grinder opening 62 in a manner similar to that shown in FIGS. 1 and 2 and has a surface configuration like that shown in FIG. 3–6. This enables the spring 64 to act as an electrostatic charge dissipator for the ground coffee 66 exiting the grinder 60 and falling through a chute 68 into the receptacle 72. The flap 70 is pivotally mounted to the side walls of the chute 68. An additional chaff spring 74 may be employed, as shown in FIG. 16, further down the chute 68. The chaff spring 74 is a L-shaped member with a leg 74a welded or otherwise secured to the front pivoting flap 70 of chute 68. A second leg 74b extends out from flap 70 across the path of the falling ground coffee 66. The surface of the second leg 74b may have the configuration shown in any of the shapes previously described, but preferably has a shape described in reference to FIGS. 3–6. The ground coffee 66, thus, impacts against the outwardly extending leg 74b and is delayed momentarily as it collects on the surface of leg 74b. The weight of the collected ground coffee on leg 74b causes the flap 70 to pivot out slightly, dumping the ground coffee. The flap 70 then pivots back to its original position and again collects the ground coffee. This time delay furthers the opportunity for any residual or additional electrostatic charge to be dissipated.

From a reading of the description above accompanied by the drawings, those with ordinary skill in the art will be able to devise further variations of dislocations in configurations of the conducting members to effectively dissipate static electric charges on the particles of materials exiting the grinder. It is believed that such variations will fall within the spirit and scope of the appended claims.

We claim:

1. An apparatus for the preparation of ground material used to make a beverage in which it is desired to prevent the separation of chaff fines from a main stream of ground material, said apparatus including a grinder, a chute leading from an exit opening in said grinder to a receptacle for receiving said ground material, and a grounded conducting element positioned adjacent said exit opening and having a plurality of dislocations in the configuration thereof, said dislocations dissipating the electrostatic charge provided to said ground material thereby minimizing the attraction of said chaff fines to surrounding surfaces of said apparatus.

2. The apparatus of claim 1 in which said element is attached to said apparatus.

3. The apparatus of claim 1 including a pair of grounded conducting elements attached to a said apparatus, a first of said elements adjacent said opening extending across said opening and a second of said elements attached to said chute and extending substantially across a path of said ground material exiting through said opening and falling down said chute to said receptacle.

4. The apparatus of claim 1 in which said grinder grinds coffee beans fed to said grinder into ground coffee, said element being a chaff spring extending across said opening having said configuration.

5. The apparatus of claim 4 in which said dislocations take the form of a plurality of sharp points on a side thereof facing the chaff emerging from said exit opening in said grinder.

6. In combination with an apparatus containing a coffee grinder having a throat opening through which ground coffee is dispensed to a receptacle and a grounded conducting chaff spring attached to said apparatus and mounted across a portion of said opening, an improvement including said chaff spring having a configuration with a plurality of dislocations for discharging electrostatic charges on said stream of ground coffee emerging through said throat opening thereby minimizing the electrostatic attraction between chaff fines in said stream of ground coffee and surrounding surfaces of said apparatus.

7. The improvement of claim 6 in which said dislocations take the form of a plurality of sharp points projecting from a side of said chaff spring facing said throat opening and said stream of ground coffee emerging from said grinder.

8. The improvement of claim 6 in which said dislocations take the form of a plurality of separated fingers of said chaff spring.

9. The improvement of claim 6 in which said dislocations take the form of an H-shaped slot through said chaff spring with a central connecting slot extending along the length of said spring.

10. The improvement of claim 6 in which said dislocations take the form of an I-shaped slot through said chaff spring with a central connecting slot extending across the length of said spring.

11. The improvement of claim 6 in which said dislocations take the form of an asterisked shaped slot on said chaff spring.

12. The improvement of claim 6 in which said dislocations take the form of a plurality of elongated sharp peaks in the surface of said chaff spring on a side thereof facing said exit opening and said stream of ground coffee emerging from said grinder.

13. The improvement of claim 6 in which said dislocations take the form of a pair of side flanges of said chaff spring upturned toward said exit opening and said stream of ground coffee emerging from said grinder.

14. An apparatus for the grinding of coffee beans into ground coffee and dissemination of ground coffee comprising a coffee grinder having an exit opening through which said ground coffee exits said grinder;

a receptacle removably mounted to said apparatus beneath said grinder for receiving said ground coffee;

a chute communicating with said opening and defining a confined path to said receptacle through which said ground coffee moves; and a grounded conducting element mounted within said apparatus and having a plurality of dislocations therein for dissipating an electrostatic charge in said ground coffee thereby minimizing the electrostatic attraction of chaff fines to surrounding surfaces of said apparatus.

15. The apparatus of claim 14 in which said grounded conducting element is a chaff spring having said dislocations, said chaff spring being mounted adjacent to and extending substantially across said exit opening.

16. The apparatus of claim 15 in which said dislocations take the form of a plurality of sharp points in a surface of said chaff spring facing a direction toward said grinder.

17. The apparatus of claims 14 in which said grounded conducting element is a chaff spring member having said dislocations, said chaff spring being mounted to a side of said chute and extending across a ground coffee passageway defined by said chute leading to a receptacle.

18. The apparatus of claim 17 in which said dislocations take the form of a plurality of sharp points in a surface of said chaff spring facing a direction toward said grinder.

* * * * *